United States Patent
Kuras et al.

(10) Patent No.: US 9,216,738 B2
(45) Date of Patent: Dec. 22, 2015

(54) PRIMARY STEERING ENABLER DURING ENGINE FAILURE

(71) Applicant: Caterpillar Paving Products, Inc., Minneapolis, MN (US)

(72) Inventors: Brian D. Kuras, East Peoria, IL (US); Michael J. Barngrover, Brimfield, IL (US)

(73) Assignee: Caterpillar Inc., Peoria, IL (US)

(*) Notice: Subject to any disclaimer, the term of this patent is extended or adjusted under 35 U.S.C. 154(b) by 50 days.

(21) Appl. No.: 14/146,492

(22) Filed: Jan. 2, 2014

(65) Prior Publication Data

US 2015/0183427 A1 Jul. 2, 2015

(51) Int. Cl.
| | |
|---|---|
| A01B 69/00 | (2006.01) |
| B60W 30/02 | (2012.01) |
| B60K 28/10 | (2006.01) |
| B60W 10/06 | (2006.01) |
| B60W 10/20 | (2006.01) |
| B60W 30/188 | (2012.01) |
| B60W 40/12 | (2012.01) |

(52) U.S. Cl.
CPC ............... B60W 30/02 (2013.01); B60K 28/10 (2013.01); B60W 10/06 (2013.01); B60W 10/20 (2013.01); B60W 30/188 (2013.01); B60W 40/12 (2013.01)

(58) Field of Classification Search
CPC ................ B60W 30/1882; B60W 10/103
USPC ................................. 701/41, 50, 54
See application file for complete search history.

(56) References Cited

U.S. PATENT DOCUMENTS

| | | | |
|---|---|---|---|
| 6,066,067 A | 5/2000 | Greenwood | |
| 8,108,108 B2 | 1/2012 | Field et al. | |
| 8,447,458 B2 | 5/2013 | Grochowski et al. | |
| 2009/0088936 A1* | 4/2009 | Hubbard et al. | 701/54 |
| 2013/0146386 A1 | 6/2013 | Jang | |

FOREIGN PATENT DOCUMENTS

| | | |
|---|---|---|
| WO | WO 2007/105863 | 9/2007 |
| WO | WO 2007105863 A1 * | 9/2007 |

* cited by examiner

*Primary Examiner* — Thomas G Black
*Assistant Examiner* — Luke Huynh
(74) *Attorney, Agent, or Firm* — Miller, Matthias & Hull LLP; Jeff A. Greene

(57) ABSTRACT

A system and method are provided for maintaining hydraulic steering for a machine during engine out or engine lugging conditions. The machine includes a torque-controlled transmission driven by an engine, the engine further being linked to a hydraulic steering pump that provides hydraulic power to a steering actuator. The machine may be, for example, a wheel loader or an off highway truck. The system and method include detecting an undesirable reduction of engine speed while the machine is travelling, and responsively reducing the transmission power to maintain the engine speed at a desired level to power the hydraulic steering pump. When the reduced requested transmission power reaches zero, a power reversal through the transmission is commanded to maintain the engine speed at the desired level to power the hydraulic steering pump.

20 Claims, 6 Drawing Sheets

PRIMARY STEERING ENABLER DURING ENGINE FAILURE

TECHNICAL FIELD OF THE DISCLOSURE

The present disclosure relates to large machine operation and, more particularly, relates to maintaining steering of a hydraulically steerable machine during a loss of primary power to the hydraulic pump.

BACKGROUND OF THE DISCLOSURE

Given the sheer size and weight of commercial driven machines such as industrial, mining, earth-moving and construction machines, the steering of these machines is generally executed hydraulically. In other words, steering commands from the operator are translated into a degree of movement or an absolute steering angle, and the requisite movement is accomplished via hydraulic power with little or no force assistance from the operator. Such hydraulic steering systems certainly ease operator strain and fatigue, and in many cases are necessary for the operator to be able to steer the machine at all.

However, there are certain failure scenarios that can disable a hydraulic steering system. For example, such systems rely on the presence of high pressure hydraulic fluid, which is generally supplied by a steering pump. The steering pump is in turn driven by the engine or other primary power source for the machine. If the engine stops or is lugged down below a certain rpm level, the steering pump may not operate, or may run too slowly to operate the steering system.

With this in mind, some hydraulic steering systems employ a secondary steering pump to back up the primary steering pump. The secondary pump may be electrically driven, since the most common failure mode for the primary pump would be loss of engine power. However, such secondary pumps incur an additional expense, and as such are typically not capable of repeated or frequent use. In addition, in some cases, secondary steering pumps are output driven, but this may cause undesirable additional losses in the overall system.

The present disclosure is directed to a system and method to improve hydraulic steering operations in order to address one or more of the problems or shortcomings set forth above. However, it should be appreciated that the solution of any particular problem is not a limitation on the scope of this disclosure or of the attached claims except to the extent expressly noted. Additionally, this background section discusses problems and solutions noted by the inventors; the inclusion of any problem or solution in this section is not an indication that the problem or solution represents known prior art except as otherwise expressly noted.

SUMMARY OF THE DISCLOSURE

In accordance with one aspect of the present disclosure, a method is provided for maintaining steering in a machine having a continuously variable torque-controlled transmission driven by an engine, the engine further being linked to a hydraulic steering pump that provides hydraulic power to a steering actuator. The method includes detecting an undesirable reduction of engine speed while the machine is travelling at a speed, and responsively reducing the transmission power to maintain the engine speed at a desired level to power the hydraulic steering pump. When the reduced requested transmission power reaches zero, a power reversal through the transmission is commanded to maintain the engine speed at the desired level to power the hydraulic steering pump.

In accordance with another aspect of the present disclosure, a machine having an engine out steering capability is provided. The machine includes an engine, a continuously variable torque-controlled transmission driven by the engine, a hydraulic steering actuator and a hydraulic steering pump configured to provide hydraulic power to the hydraulic steering actuator. The machine also includes a controller configured to detect that the engine speed has dropped below a desired speed threshold while the machine is moving and in response, to reduce transmission power to maintain the engine speed at a desired level to power the hydraulic steering pump, including commanding a power reversal through the transmission to cause machine momentum to drive the engine.

In accordance with yet another aspect of the present disclosure, a transmission controller is provided for facilitating an engine out steering capability on a machine with a continuously variable torque-controlled transmission and a hydraulically actuated steering capability. The controller includes a processor configured to read and execute computer-executable instructions from a computer-readable medium. The controller also includes a computer-readable medium associated with the processor, the computer-readable medium having thereon computer executable instructions including instructions to detect an undesirable reduction of engine speed while the machine is moving, to reduce the transmission power via the torque command to maintain the engine speed at a desired level to power the hydraulic steering pump, and to command a power reversal through the transmission to maintain the engine speed at the desired level.

Additional and alternative feature and aspects of the disclosed methods and systems will become apparent from reading the detailed specification in conjunction with the included drawing figures.

DETAILED DESCRIPTION OF THE DISCLOSURE

As noted above, when the engine of a large steerable machine becomes inoperative or inadequate (e.g., due to fuel pump failure, clogged fuel filter, lack of fuel, severe lugging, etc.) the primary steering system may become inoperative. In machines having secondary steering pumps, the secondary pump would then be activated, while machines lacking such a backup would have no steering while coming to a stop. While certain countries and locales require the installation of a secondary steering pump, other countries and locales do not specify a backup in the event the primary steering pump fails. For example, no backup system is specified under US law.

In any event, frequent triggering of the secondary pump puts unnecessary wear on that pump when the lack of engine power is highly viable such as during temporary severe lugging or when the primary steering pump pressure is severely low. While omitting the secondary pump by definition eliminates wear and tear on such a pump, this approach provides no steering power after engine failure. However, in an embodiment of the disclosed principles, the momentum of the machine itself is used in a reverse power mode to power the steering function during lugging or engine failure.

Figure 1:
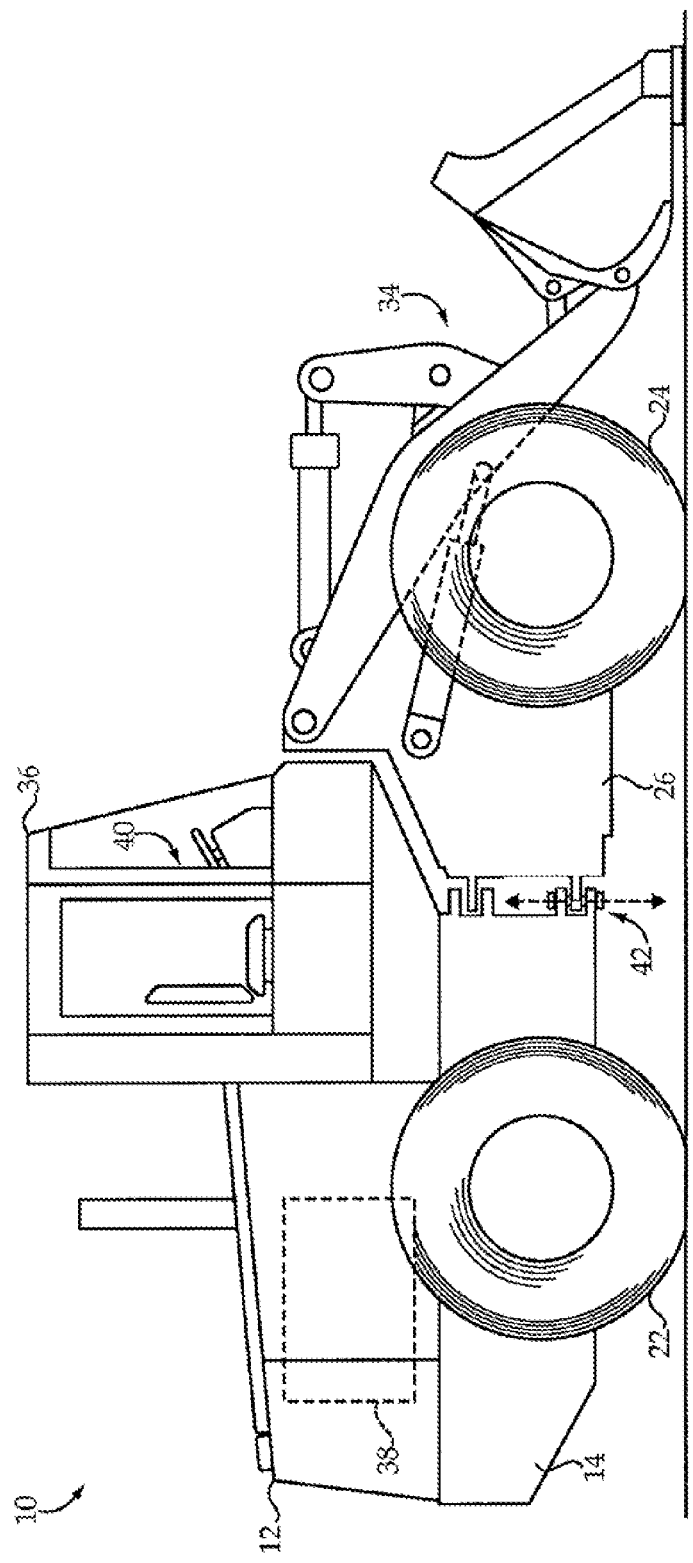
FIG. 1 is a pictorial representation of a side view of an exemplary machine within which embodiments of the disclosed principles may be implemented.

Before discussing specific details and features of the disclosed embodiments, an example environment will be discussed. In this regard, FIG. 1 shows a simplified side view of a wheel loader within which embodiments of the disclosed principles may be implemented. Referring to FIG. 1, there is shown a ground engaging machine 10 by way of example. Machine 10 is illustrated as an articulated wheel loader having a frame 12 including a first frame unit 14 and a second frame unit 26, wherein the second frame unit 26 is coupled to the first frame unit 14. A first set of ground engaging elements 22, which may be ground engaging wheels, are coupled to frame unit 26, and a second set of ground engaging elements 24, which may also include ground engaging wheels, are coupled to frame unit 14.

In the illustrated example, an engine 38 is mounted to the frame unit 14. An operator cab 36 having an operator control station 40 is positioned on the frame unit 14 in a conventional manner. An implement system 34 including for instance a bucket, lift arms and actuating system, is shown coupled to frame unit 26. An articulation hitch 42 couples frame units 14 and 26 together. One or more hydraulic articulation actuators, not shown, are used to articulate the frame unit 26 and frame unit 14 relative to one another.

Ground engaging elements 22 and 24 will typically not be configured to pivot relative to their respective frame units for purposes of steering. Instead, articulation steering typically provides the sole means of steering the machine 10. However, in other embodiments, wheel steering can be used alone or in combination with articulation steering.

Figure 2:
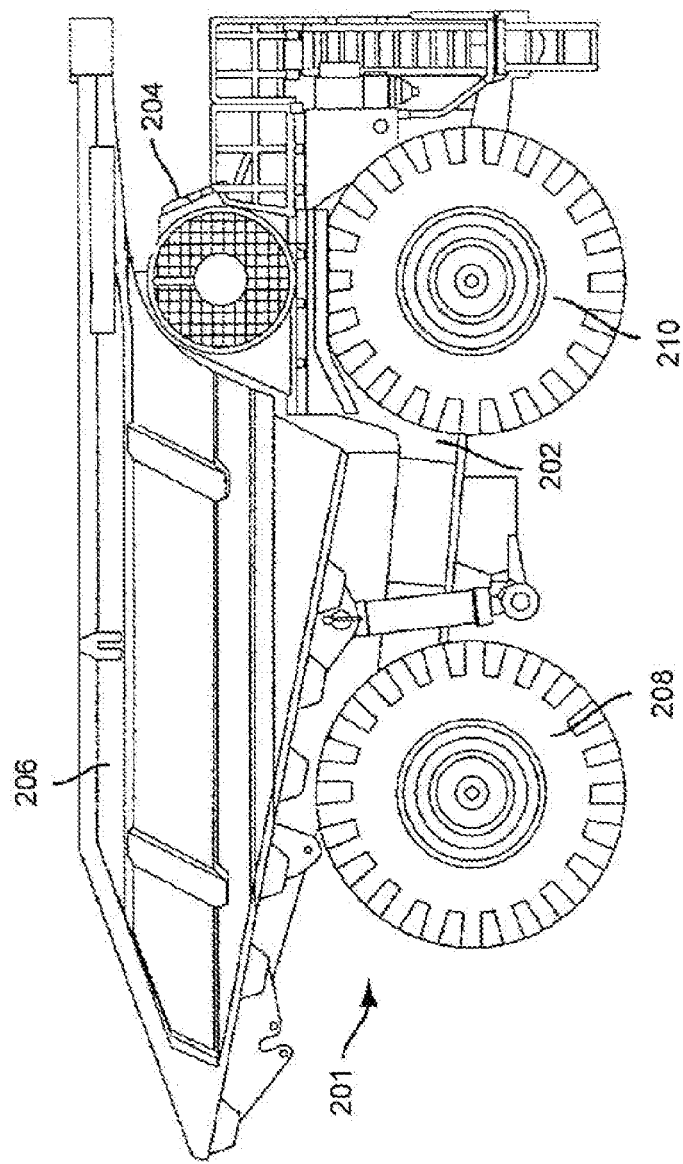
FIG. 2 is a pictorial representation of a side view of another exemplary machine within which embodiments of the disclosed principles may be implemented.

Another exemplary implementation platform is shown schematically in FIG. 2. In particular, FIG. 2 shows an off-highway truck within which embodiments of the disclosed principles may be implemented. The off-highway truck 201 of FIG. 2 includes a wheel drive system having a CVT transmission providing a wide range of output torque at desired engine speeds enabling the off-highway truck 201 to drive on a variety of sloped surfaces having various grades while carrying potentially heavy loads.

The off-highway truck 201 includes a chassis 202 that supports an operator cab 204 and a bucket 206. The bucket 206 is pivotally connected to the chassis 202 and is arranged to carry a payload when the off-highway truck 201 is in service. An operator occupying the operator cab 204 controls the motion and the various functions of the off-highway truck 201. The chassis 202 supports various drive system components. These drive system components rotate a set of drive wheels 208 to propel the off-highway truck 201 over a range of sloped surfaces. A set of idle wheels 210 steer the vehicle such that the off-highway truck 201 can be steered in any direction.

Figure 3:
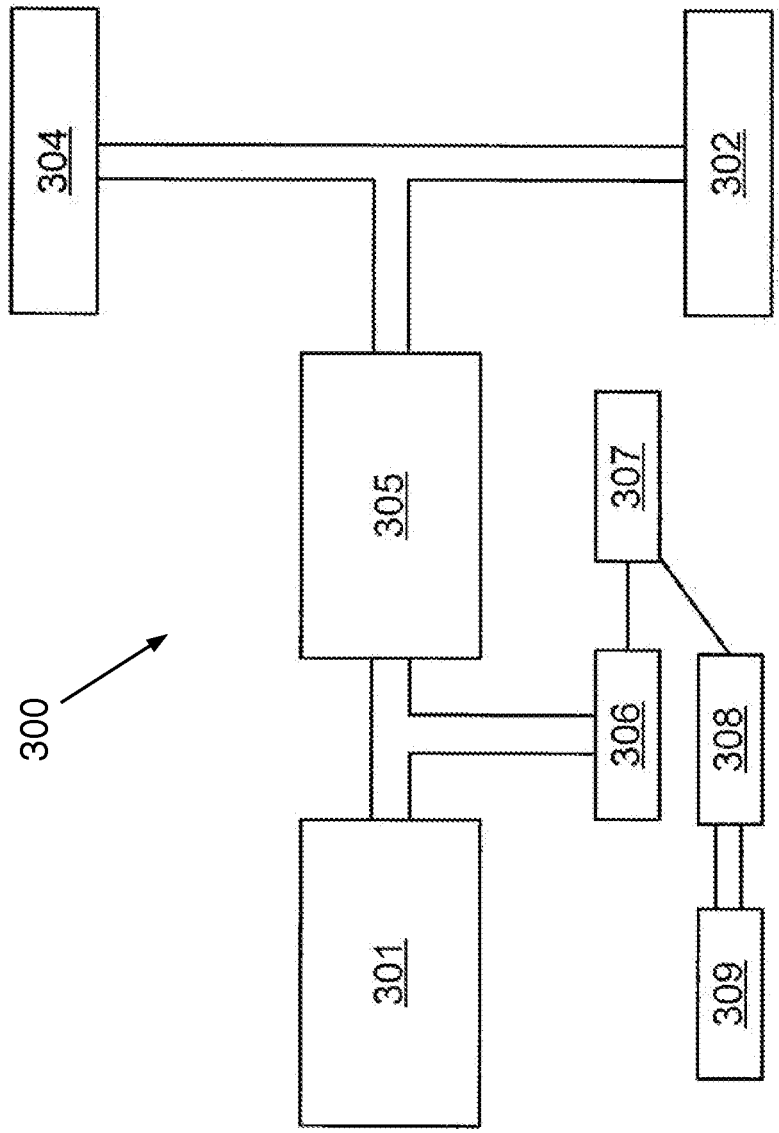
FIG. 3 is a schematic drawing of a transmission and steering control system in accordance with in an embodiment of the disclosed principles.

FIG. 3 schematically illustrates the main power and hydraulic components for machines such as those shown in FIGS. 1 and 2. The schematized machine 300 includes a primary power source for the machine such as an engine 301. The engine 301 drives one or more ground-engaging elements 302, 304, e.g., tires or tracks, via a transmission 305. The transmission 305 may be a continuously variable transmission (CVT) or other torque-controlled transmission.

Figure 4:
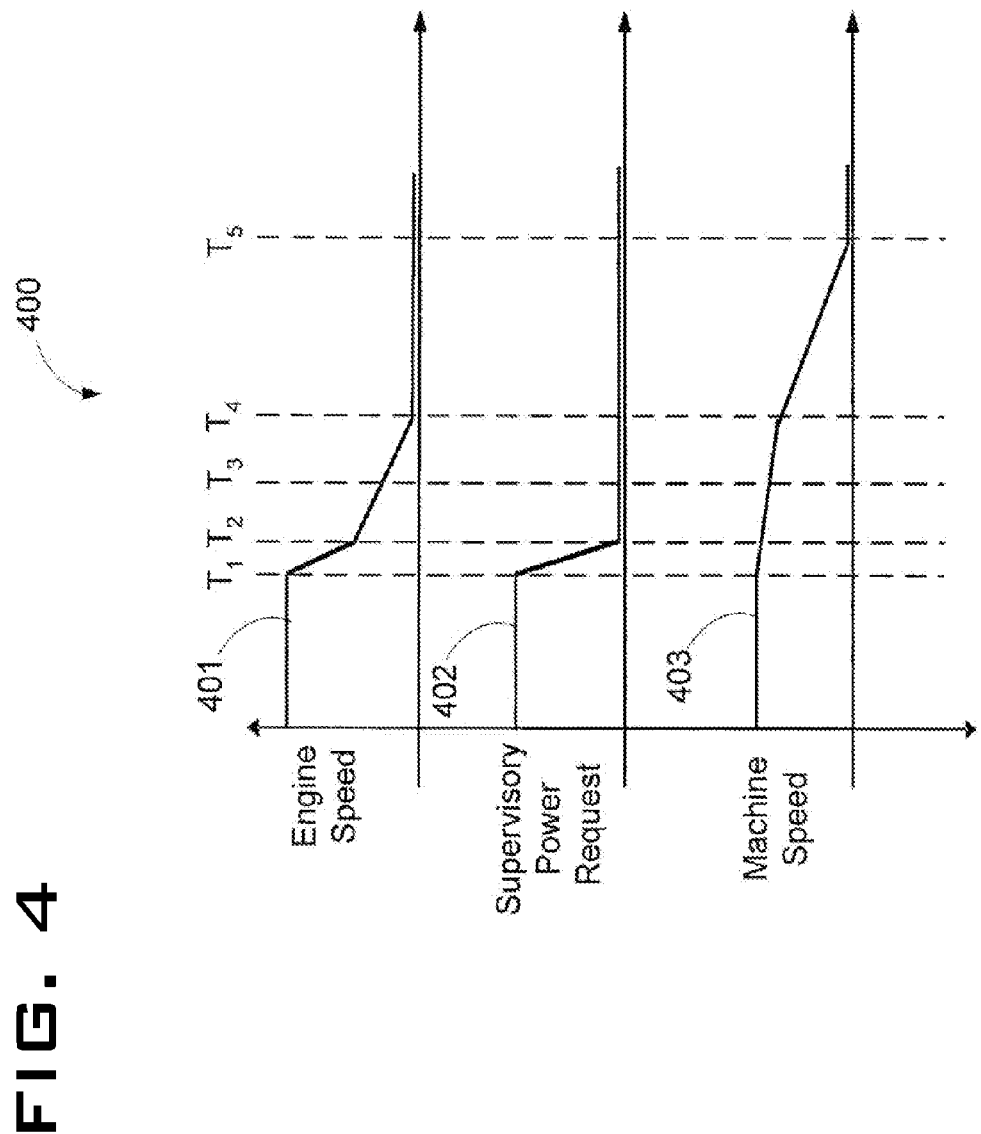
FIG. 4 is a timing plot showing traditional continuously variable transmission torque control behavior.

A primary steering pump 306 is mechanically driven by the engine 301, such that the pump speed may be proportional to the engine speed. The primary steering pump 306 provides pressurized hydraulic fluid to a hydraulic steering unit 307, which may be a frame articulation actuator, a wheel steering actuator, and so on. In more general terms, the hydraulic steering unit 307 acts to change an angle between steering One could conceivably add an optional secondary steering pump 308 to the system as a back-up or fail safe. The secondary steering pump 308 could be powered by an electric motor 309, so as to provide hydraulic steering power in the event that the speed of the engine 301 falls below a threshold rpm value. The possible operation of the electric motor 309 and the secondary steering pump 308 is shown in the simplified chart 400 of FIG. 4. In particular, the chart 400 shows the machine engine speed 401, power command 402 and transmission output speed (TOS) 403.

Initially, that is, up to time $T_1$, the machine is travelling at a certain speed, e.g., at 20 mph, with some propulsion power/torque command. At time $T_1$, the engine runs out of fuel or for some other reason can no longer produce torque. At this moment, though not fully powered, the engine or input shaft is still free to rotate and the primary steering pump connected to the engine or input shaft is still working since the engine is still spinning. However, as the engine begins to slow down after time $T_1$, a supervisory control architecture could sense the engine lug and reduce the power command via the torque command to zero between time $T_1$ and time $T_2$.

After time $T_2$, the engine speed continues to zero due to fuel starvation, reaching zero rpm at time $T_4$, but is unloaded such that the rate of deceleration slows somewhat after time $T_2$. Meanwhile, once engine speed falls below a threshold rpm value such as 400 rpm at time $T_3$, the 24V motor associated with the secondary steering pump would be activated to spin the secondary steering pump. This state would continue until the transmission output speed, also the machine speed, dropped to or near zero at time $T_5$. As noted above, while this mode of supervisory control would allow steering to occur, it would also require a secondary pump and would place undue wear on that secondary pump, requiring frequent repair or replacement of the secondary pump, and providing no steering if the secondary pump were to fail.

Torque control, as in the foregoing example, is traditionally enabled via proportional integral (PI) control that relates a power or torque command to engine speed and transmission output speed. In order to maintain engine speed above the lugging threshold, the controller reduces the desired transmission power via the torque command to unload the engine. In the past, once the desired transmission power is essentially zero, the controller makes no more attempt to reduce engine lugging, and the desired transmission power simply remains at zero.

Figure 5:
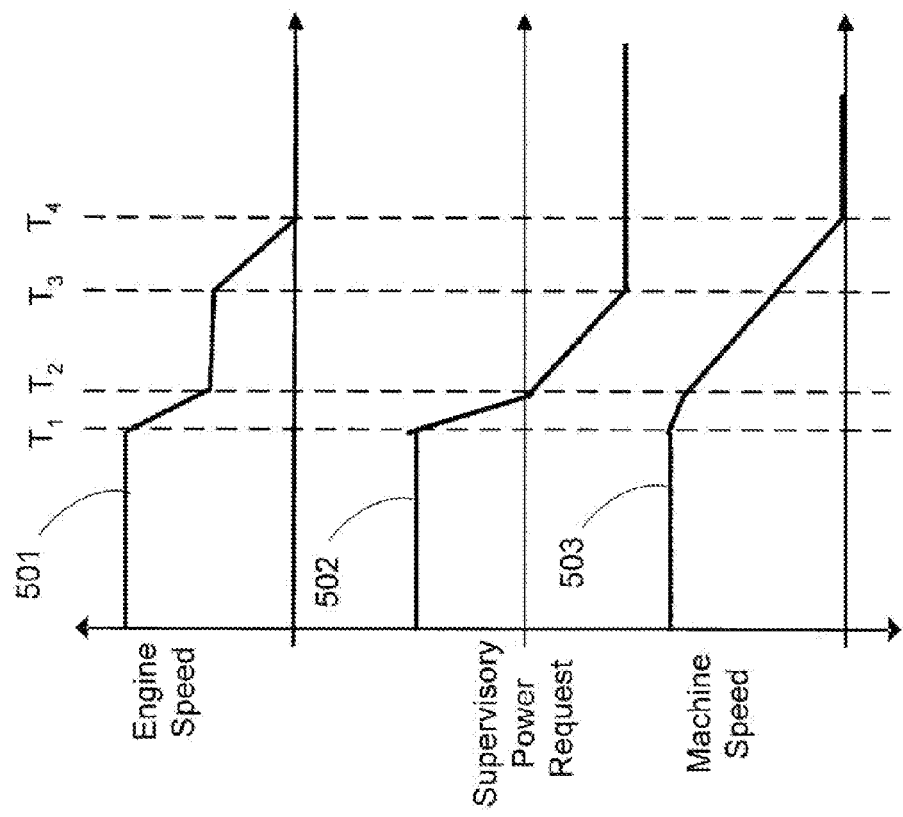
FIG. 5 is a timing plot showing transmission torque control behavior in accordance with in an embodiment of the disclosed principles.

However, in an embodiment of the disclosed principles, the controller is configured to actually reverse desired transmission power via the torque command in an attempt to maintain engine speed (and thus to maintain the speed of the primary, or perhaps only, steering pump). FIG. 5 is a simplified time plot 500 showing the implementation of this functionality with respect to machine engine speed 501, power command via the torque command 502 and transmission output speed (TOS) 503.

Initially, until time $T_1$, the machine is again travelling with some desired transmission power via the torque command. At time $T_1$, suppose the engine runs out of fuel or for some other reason can no longer produce torque. As the engine begins to slow down after time $T_1$, the supervisory control senses the engine lug and reduces the desired transmission power via the torque command to zero between time $T_1$ and time $T_2$.

As the engine speed continues to fall or stays lugged at time $T_2$, the supervisory control reverses the sign of the desired transmission power via the torque command, thus commanding negative desired transmission power, causing a power reversal from the driven ground engaging elements to the engine. This forces the transmission output speed to slow, but it enables the engine to remain rotating, thus also maintaining the primary pump speed.

Because there is no power coming into the system from the engine, the machine speed (proportional to TOS 503), continues to drop while propping up the engine speed 501 between time $T_2$ and $T_3$. At time $T_3$, the maximum desired transmission power reversal is reached. Eventually, available transmission output power is too low to maintain engine speed and engine speed drops to zero.

As can be seen, full and effective steering is enabled until time $T_3$ when the machine forward speed is also low. This eliminates the need for a secondary pump for those machines traditionally having such a pump. For those machines not traditionally having such a pump, this provides a backup power source to allow steering after engine failure. While the power reversal enabled by the described control system also serves to hinder machine forward speed, i.e., to retard machine speed, this is a desirable consequence in a situation wherein engine power has been lost.

INDUSTRIAL APPLICABILITY

In general terms, the present disclosure sets forth a system and method for providing primary steering power even during a loss of engine power. This eliminates the need for a secondary steering pump while also ensuring that the primary pump is powered whenever the machine is moving. The above examples illustrate the disclosed principles in the context of a wheel loader and an off-highway truck. However, it will be appreciated that any other hydraulically-steered industrial, manufacturing, farming, mining or earth moving machine may also benefit from application of the disclosed principles.

Figure 6:
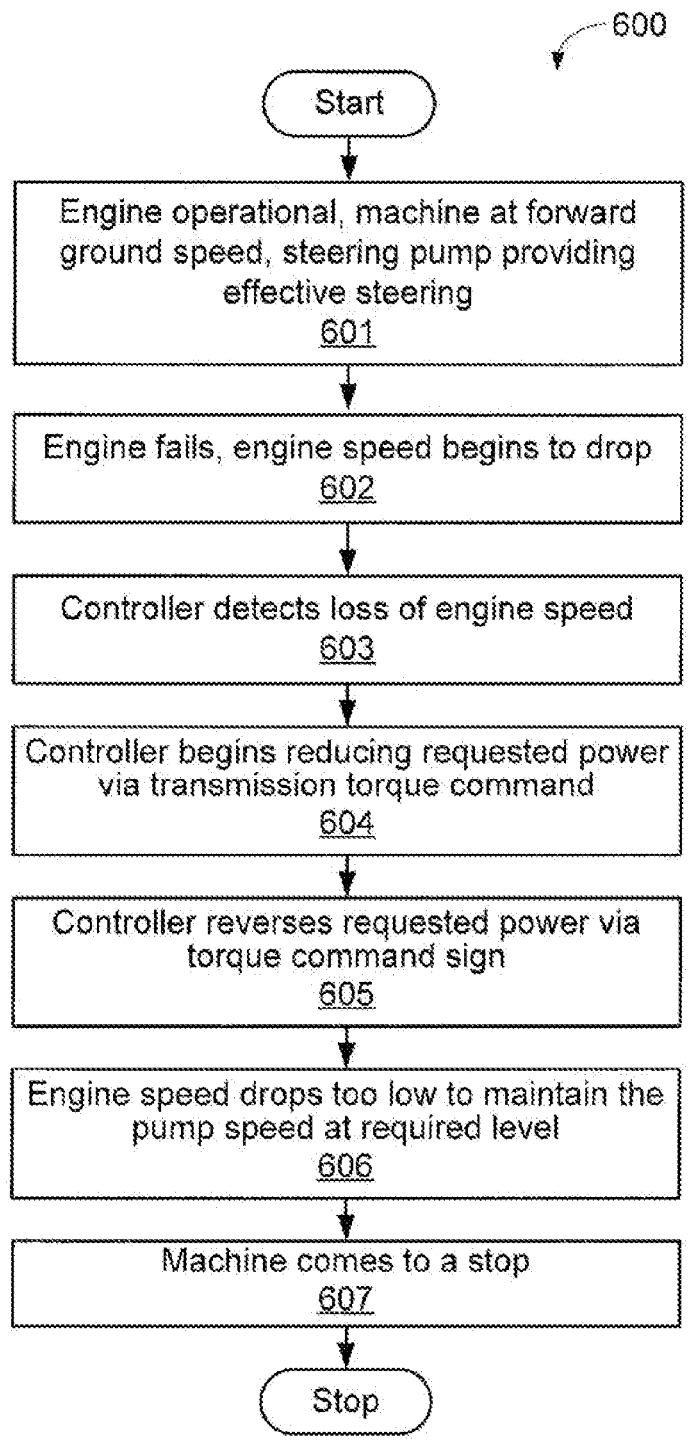
FIG. 6 is a flow chart showing an exemplary process of transmission and steering control in accordance with in an embodiment of the disclosed principles.

The flowchart 600 of FIG. 6 shows an exemplary manner in which the supervisory control process with respect to desired power via torque may be executed. It will be appreciated that other equivalent processes may be used without departing from the scope of the disclosed principles. At stage 601 of the process 600, the machine is operating with the engine operational, the machine at forward ground speed, and the steering pump running at a level that meets or exceeds the pump speed needed for effective steering.

At stage 602, the engine fails, and its speed begins to drop. The controller detects loss of engine speed at stage 603 and at stage 604 begins anti-lugging operation by reducing the transmission desired power via the torque command. When the power command reaches zero and the pump speed, e.g., the transmission input speed, continues to drop, the controller reverses the power command via the torque, commanding a power reversal at stage 605. This has the effect of propping up the engine speed and hence the pump speed. At some point subsequently, shown in stage 606, adequate retarding output power cannot be maintained due to slow machine speed and the engine speed drops too low to maintain the pump speed at an effective level. However, shortly thereafter at stage 607, the machine comes to a stop.

It will be appreciated that the present disclosure provides an effective and efficient mechanism and control system for providing steering power during engine put situations. Not only do the described system and method generally improve steering ability after an engine out event, but they also eliminate the need for a secondary steering pump and power system for that pump.

While only certain examples of the described system and method have been set forth, alternatives and modifications will be apparent from the above description to those skilled in the art. These and other alternatives are considered equivalents and within the spirit and scope of this disclosure and the appended claims.

What is claimed is:

1. A method of providing steering in a machine having a torque-controlled transmission driven by an engine, the engine further being linked to a hydraulic steering pump that provides hydraulic power to a steering actuator, the method comprising:
    detecting an undesirable reduction of engine speed while the machine is travelling at a speed pursuant to a torque command to the transmission;
    reducing the transmission power via the torque command to maintain the engine speed at a desired level to power the hydraulic steering pump; and
    when the reduced transmission power reaches zero, commanding a power reversal through the transmission to maintain the engine speed at the desired level to power the hydraulic steering pump.

2. The method of providing steering in accordance with claim 1, wherein the torque-controlled transmission is a continuously variable transmission CVT).

3. The method of providing steering in accordance with claim 1, wherein the steering actuator is connected to articulate a frame of the machine.

4. The method of providing steering in accordance with claim 3, wherein the machine is a wheel loader.

5. The method of providing steering in accordance with claim 1, wherein the steering actuator is connected to pivot one or more steerable wheels of the machine.

6. The method of providing steering in accordance with claim 5, wherein the machine is an off-highway truck.

7. The method of providing steering in accordance with claim 1, wherein commanding a power reversal through the transmission to maintain the engine speed at the desired level to power the hydraulic steering pump further comprises maintaining the engine speed at the desired level as long as sufficient power is available through the power reversal to maintain the engine speed at the desired level.

8. The method of providing steering in accordance with claim 1, wherein detecting an undesirable reduction of engine speed while the machine is travelling at a speed includes detecting the undesirable reduction of engine speed while the machine is travelling at a forward speed.

9. The method of providing steering in accordance with claim 1, wherein detecting an undesirable reduction of engine speed while the machine is travelling at a speed includes detecting the undesirable reduction of engine speed while the machine is travelling at a reverse speed.

10. A machine having an engine out steering capability, the machine comprising:
    an engine;
    a torque-controlled transmission driven by the engine;
    a hydraulic steering actuator;
    a hydraulic steering pump configured to provide hydraulic power to the hydraulic steering actuator; and
    a controller configured to detect that the engine speed has dropped below a desired speed threshold while the machine is moving and in response, to reduce transmission power to maintain the engine speed at a desired level to power the hydraulic steering pump, including commanding a power reversal through the transmission to cause machine momentum to drive the engine.

11. The machine in accordance with claim 10, wherein the torque-controlled transmission is a continuously variable transmission CVT).

12. The machine in accordance with claim 10, wherein the steering actuator is connected to articulate a frame of the machine.

13. The machine in accordance with claim 12, wherein the machine is a wheel loader.

14. The machine in accordance with claim 10, wherein the steering actuator is connected to pivot one or more steerable wheels of the machine.

15. The machine in accordance with claim 14, wherein the machine is an off-highway truck.

16. The machine in accordance with claim 10, wherein the controller is further configured to maintain the engine speed at the desired level as long as sufficient power is available through the power reversal to maintain the engine speed at the desired level.

17. A transmission controller for providing engine out steering capability to a machine with a torque-controlled transmission and a hydraulically actuated steering capability, the controller comprising:
 a processor configured to read and execute computer-executable instructions from a computer-readable medium; and
 a non-transitory computer-readable medium associated with the processor, the computer-readable medium having thereon computer executable instructions including:
  instructions to detect an undesirable reduction of engine speed while the machine is moving;
  instructions to reduce the transmission power via the torque command to maintain the engine speed at a desired level to power the hydraulic steering pump; and
  instructions to command a power reversal through the transmission to maintain the engine speed at the desired level when the reduced transmission power reaches zero.

18. The transmission controller in accordance with claim 17, wherein the instructions to command a power reversal through the transmission to maintain the engine speed at the desired level further include instructions to maintain the engine speed at the desired level as long as sufficient power is available through the power reversal to maintain the engine speed at the desired level.

19. The transmission controller in accordance with claim 17, wherein the instructions to instructions to detect an undesirable reduction of engine speed while the machine is moving include instructions to detect the undesirable reduction of engine speed while the machine is moving in a forward direction.

20. The transmission controller in accordance with claim 17, wherein the instructions to instructions to detect an undesirable reduction of engine speed while the machine is moving include instructions to detect the undesirable reduction of engine speed while the machine is moving in a rearward direction.

* * * * *